United States Patent
Strope et al.

(10) Patent No.: US 9,110,880 B1
(45) Date of Patent: Aug. 18, 2015

(54) ACOUSTICALLY INFORMED PRUNING FOR LANGUAGE MODELING

(71) Applicant: Google, Inc., Mountain View, CA (US)

(72) Inventors: Brian Strope, Palo Alto, CA (US); Francoise Beaufays, Mountain View, CA (US)

(73) Assignee: Google Inc., Mountain View, CA (US)

(*) Notice: Subject to any disclaimer, the term of this patent is extended or adjusted under 35 U.S.C. 154(b) by 299 days.

(21) Appl. No.: 13/832,160

(22) Filed: Mar. 15, 2013

Related U.S. Application Data

(60) Provisional application No. 61/762,544, filed on Feb. 8, 2013.

(51) Int. Cl.
*G06F 17/27* (2006.01)

(52) U.S. Cl.
CPC ................................ *G06F 17/27* (2013.01)

(58) Field of Classification Search
USPC ............... 704/1–10, 231, 236, 250, 238–242, 704/255, 257, 235, 251, 270
See application file for complete search history.

(56) References Cited

U.S. PATENT DOCUMENTS 6,711,541 B1 * 3/2004 Kuhn et al. ................... 704/242

OTHER PUBLICATIONS

Stolcke, Andreas, "Entropy-based Pruning of Backoff Language Models," Proceedings of the DARPA Broadcast News Transcription and Understanding Workshop, Jun. 11, 2000, 5 pages.

* cited by examiner

*Primary Examiner* — Huyen Vo
(74) *Attorney, Agent, or Firm* — Fish & Richardson P.C.

(57) ABSTRACT

Methods, systems, and apparatus, including computer programs encoded on a computer storage medium, for pruning a language model are disclosed. The methods, systems, and apparatus include actions of selecting a candidate portion of the language model to evaluate for pruning, obtaining an entropy score representing information loss that would result from pruning the candidate portion of the language model, obtaining an acoustic score representing acoustic confusability of one or more words modeled by the candidate portion of the language model, and evaluating whether to prune the candidate portion of the language model using the entropy score and the acoustic score.

17 Claims, 3 Drawing Sheets

ACOUSTICALLY INFORMED PRUNING FOR LANGUAGE MODELING

CROSS-REFERENCE TO RELATED APPLICATIONS

This application claims the benefit of U.S. Provisional Patent Application No. 61/762,544, filed Feb. 8, 2013, the entirety of which is hereby incorporated by reference as if fully set forth therein.

TECHNICAL FIELD

This disclosure generally relates to language modeling.

BACKGROUND

Automatic speech recognition (ASR) may be used to transcribe spoken language into written language using language modeling.

SUMMARY

In general, an aspect of the subject matter described in this specification may involve a process for pruning a language model. A language model may be used to transcribe spoken language into written language. The language model may include sequences of one or more contiguous items, e.g., words or portions of words, to which spoken utterances may be matched. The contiguous items may provide context that may be used for estimating the correct transcription, e.g., distinguishing similar sounding words used in different contexts. The transcription process may use the language model to estimate the utterances by considering matching sequences with more items more probably correct than matching sequences with fewer items.

Pruning a language model may reduce the size or complexity of the language model, which may reduce costs or increase processing speed. A language model may be pruned by removing portions of the language model. However, pruning a language model may reduce the accuracy of the language model. For example, pruning a language model down to only sequences of single items may result in a language model that is unable to differentiate between similar sounding words.

A process for pruning the language model may select candidate portions of the language model and evaluate whether to remove the candidate portions based on both information loss from removing the candidate portions and acoustic confusability of one or more words modeled by the candidate portions. The evaluation may result in pruning candidate portions where pruning the candidate portions does not significantly reduce the accuracy of the language model and retaining candidate portions where pruning the candidate portions does significantly reduce the accuracy of the language model.

In some aspects, the subject matter described in this specification may be embodied in methods that include the actions of selecting a candidate portion of the language model to evaluate for pruning and obtaining an entropy score representing information loss that would result from pruning the candidate portion of the language model. Additional actions include obtaining an acoustic score representing acoustic confusability of one or more words modeled by the candidate portion of the language model and evaluating whether to prune the candidate portion of the language model using the entropy score and the acoustic score.

Other versions include corresponding systems, apparatus, and computer programs, configured to perform the actions of the methods, encoded on computer storage devices.

These and other versions may each optionally include one or more of the following features. For instance, in some implementations the language model includes sequences of contiguous items and the candidate portion includes a sequence of contiguous items.

In certain aspects, the candidate portion includes a homophone and the language model includes second contiguous sequence of items that includes a corresponding homophone.

In certain aspects, obtaining the acoustic score includes determining whether the candidate portion includes a homophone.

In certain aspects, evaluating includes obtaining a pruning threshold and adjusting the pruning threshold based on the acoustic score. Evaluating also includes comparing the entropy score to the adjusted pruning threshold and determining whether to prune the candidate portion based on the comparison.

In some aspects, evaluating includes obtaining a pruning threshold, adjusting the entropy score based on the acoustic score, comparing the adjusted entropy score to the pruning threshold, and determining whether to prune the candidate portion based on the comparison.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Language models may be used for transcribing utterances into text, for example, in automated speech recognition (ASR) systems. However, words may sound similar but have different spellings and meanings. For example, the word "blue" and the word "blew" have the same pronunciation but have different spellings and meanings.

To distinguish between similar sounding words, the language model may include portions which may include sequences of contiguous items. Each portion of the language model may correspond to a sequence, each sequence may include one or more items, and each item may be a word or a portion of a word. For example, the language model may include a portion including a sequence of words "the color blue" that designates that an utterance that sounds like "blue" that occurs in the sequence of three words that sounds like "the color blue" corresponds to the word "blue" instead of the word "blew."

However, including many portions in the language model may increase the size and complexity of the language model. For example, if the language model included ten words and included only sequences with a single word, then only ten different sequences, each of one word, may be included in the language model. However, if the language model included ten words and used sequences up to two words, then one hundred different sequences of two words may be included in the language model, as well as ten different sequences of one word.

A language model may be pruned to reduce size and complexity of the language model. The language model may be pruned by removing portions of the language model. Particular sequences of one or more words may be removed from the language model. For example, a sequence of two words for "the color" may be pruned as the words "the" and "color" may have no other similar sounding words so may be transcribed based on sequences of only the individual words. However, pruning a sequence of two words "color blue" may significantly decrease the accuracy of the language model as "blue" in utterances of "color blue" may be erroneously transcribed as "blew."

Figure 1:
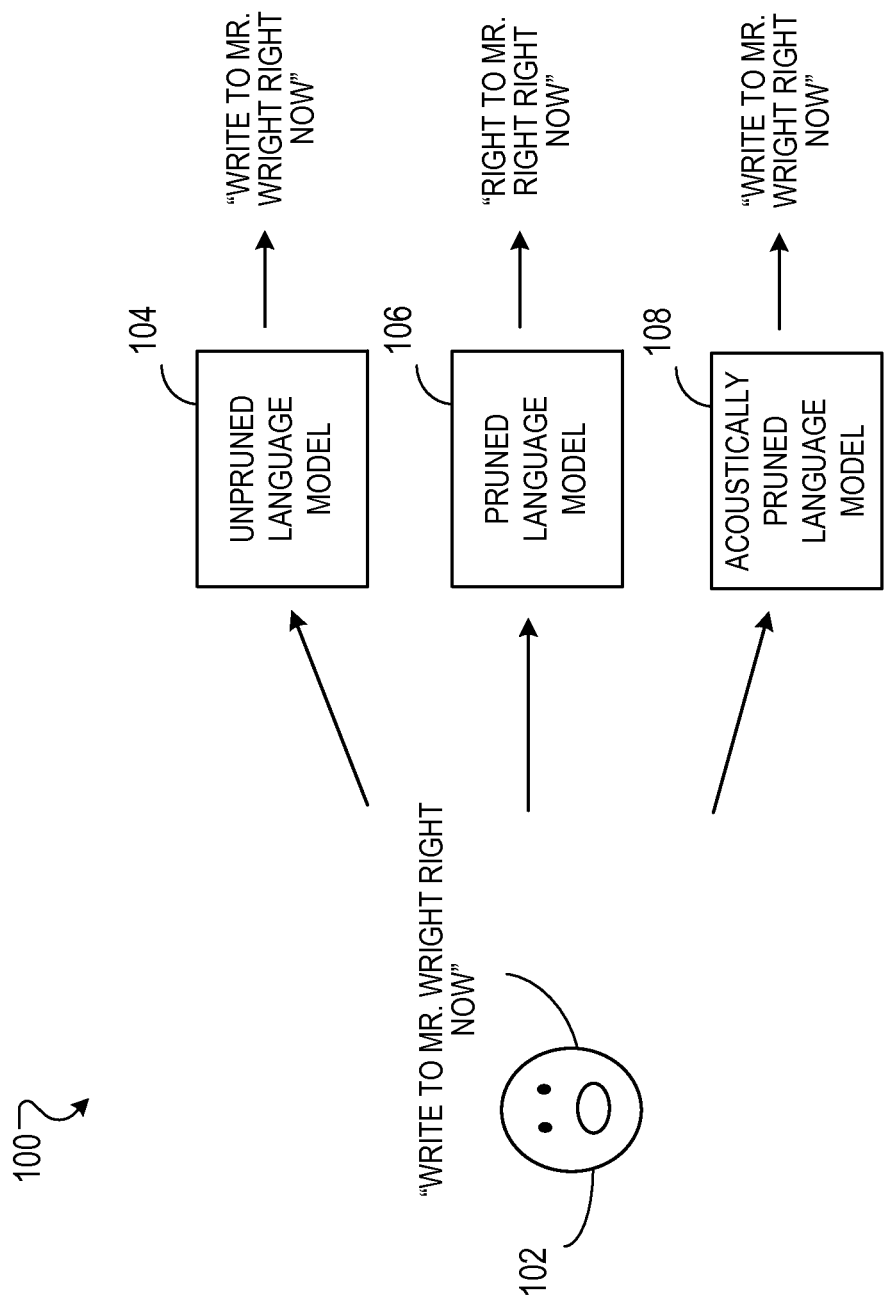
FIG. 1 is a block diagram of an example system for transcribing utterances.

FIG. 1 is a block diagram of an example system 100 for transcribing utterances. A user 102 may provide an utterance "WRITE TO MR. WRIGHT RIGHT NOW" to the system 100. For example, the user 102 may provide the utterance by speaking to a mobile device.

In system 100, the utterance may be transcribed using an unpruned language model 104. For example, the unpruned language model 104 may be used to transcribe the utterance "WRITE TO MR. WRIGHT RIGHT NOW" to the text "WRITE TO MR. WRIGHT RIGHT NOW." The unpruned language model 104 may include sequences of contiguous items. For example, the unpruned language model 104 may include the sequence of items "WRITE TO," "WRITE TO MR.," "WRITE TO MR. WRIGHT," "MR. WRIGHT," "WRIGHT RIGHT," and "RIGHT NOW." The unpruned language model 104 may include sequences that correspond to all possible orders of items in all possible combination of items.

The system 100 may use the sequences in the unpruned language model 104 to transcribe utterances into text. The unpruned language model 104 may associate a probability of correctness to each sequence. For example, the sequence "RIGHT WRIGHT NOW" may occur infrequently and be associated with a probability of correctness lower than the sequence "WRIGHT RIGHT NOW" that may occur more frequently. Continuing with the example, the system 100 may analyze the utterance "WRITE TO MR. WRIGHT RIGHT NOW" and determine that the portion of the utterance corresponding to "WRIGHT RIGHT NOW" should be transcribed as "WRIGHT RIGHT NOW" because the sequence "WRIGHT RIGHT NOW" has a higher probability of correctness than "RIGHT WRIGHT NOW" in the unpruned language model 104.

Longer sequences in the unpruned language model 104 may be associated with higher probabilities. For example, the sequence "WRIGHT RIGHT NOW" may have a higher probability than "WRIGHT RIGHT." Accordingly, if the sequence "RIGHT WRIGHT" has a higher probability than "WRIGHT RIGHT," but a lower probability than "WRIGHT RIGHT NOW," the portion of the utterance corresponding to "WRIGHT RIGHT" may be erroneously transcribed as "RIGHT WRIGHT" if the unpruned language model 104 did not include the sequence "WRIGHT RIGHT NOW."

In system 100, the utterance may alternatively or additionally be transcribed using a pruned language model 106. The pruned language model 106 may function similarly to unpruned language model 104, but may have fewer and shorter sequences of contiguous items. For example, the pruned language model 106 may be pruned to only include sequences with a single item, and may only include one sequence, e.g., "RIGHT" that sounds like "WRITE," "WRIGHT," and "RIGHT." The system 100 may receive the utterance "WRITE TO MR. WRIGHT RIGHT NOW" and use the pruned language model 106 to determine that the portions of the utterance that sound like "RIGHT," which includes portions corresponding to "WRITE" and "WRIGHT," correspond to the sequence "RIGHT" so the utterance "WRITE TO MR. WRIGHT RIGHT NOW" may be incorrectly transcribed as "RIGHT TO MR. RIGHT RIGHT NOW."

In system 100, the utterance may alternatively or additionally be transcribed using an acoustically pruned language model 108. The acoustically pruned language model 108 may be pruned based on the acoustics of portions of the sequences within the acoustically pruned language model 108, e.g., how words sound. The acoustically pruned language model 108 may include fewer sequences than the unpruned language model 104 while providing more accurate transcriptions than the pruned language model 106. For example, the system 100 may receive the utterance "WRITE TO MR. WRIGHT RIGHT NOW" and use the acoustically pruned language model 108 to transcribe the utterance correctly as "WRITE TO MR. WRIGHT RIGHT NOW."

In a detailed example, a language model, an acoustic model and a pronunciation model may be used by the system 100 to search for transcriptions for an utterance. A search may be an efficient process for checking nearly all possible alignments of nearly all potential sentences, expanded into sequences of phones, against received utterances.

The language model, the acoustic model, and the pronunciation model may be used as constraints in the search. The language model may give probability scores for different potential sentences. The acoustic model may represent the likelihood of a particular context dependent phone ("an 0 sound with an L sound before it and silence after"), and the sequence of phones for any particular word may be given by the pronunciation dictionary.

The search may consider the models simultaneously so that the language model gives scores for complete sentences, the pronunciation model maps the words in the sentences to phones, and the acoustic model measures how similar the portions of the utterance are to the resulting sequences of context dependent phones.

The language model may give a score for each potential sentence that can be constructed given the vocabulary. If it's a 10-word vocabulary, and the language model only includes the probabilities for each word (unigram probabilities), then the probability for the arbitrary sentence Sx=A B C D may be P(Sx)=P(A) P(B) P(C) P(D), where the unigram probability for P(B) may be just the number of times the word B is in a training corpus divided by the total number of words in the training corpus.

If the language model is a little bigger, including trigrams, or 3-grams, and all the trigrams for this sentence are kept in the language model after pruning, then the probability for this sentence may become: P(Sx)=P(A) P(B|A) P(C|A,B) P(D|B, C)

In this case P(A) is a unigram, P(B|A) is a bigram (probability of B given the proceeding word is A), and P(C|A,B) is the first trigram. Note that P(D|B,C) is also a trigram, it uses the longest span of the current model (only up to trigrams), but it overlaps the previous trigram by two words. The sentence A B C D may additionally or alternative be transformed to the sentence <S> A B C D </S>, and then estimated using: P(Sx)=P(A|<S>) P(B|<S>,A) P(C|A,B) P(D|B,C) P(</S>|C, D).

In pruning the language model, instead of using the full trigram somewhere, the system 100 may "backoff" to the bigram. For example, if the trigram P(D|B,C) was rarely seen in the data, the trigram may be pruned and in its place the bigram P(D|C) may be used. The probability for P(D|C) may represent the probability for any trigram that is not in the language model, e.g., P(D|x,C), where x is a word that does not appear before C followed by D in a trigram in the language model. The probability for bigram P(D|C) may be lower than the probability for trigram p(D|B,C) so a backoff from the trigram to the bigram may function as a probability penalty.

Figure 2:
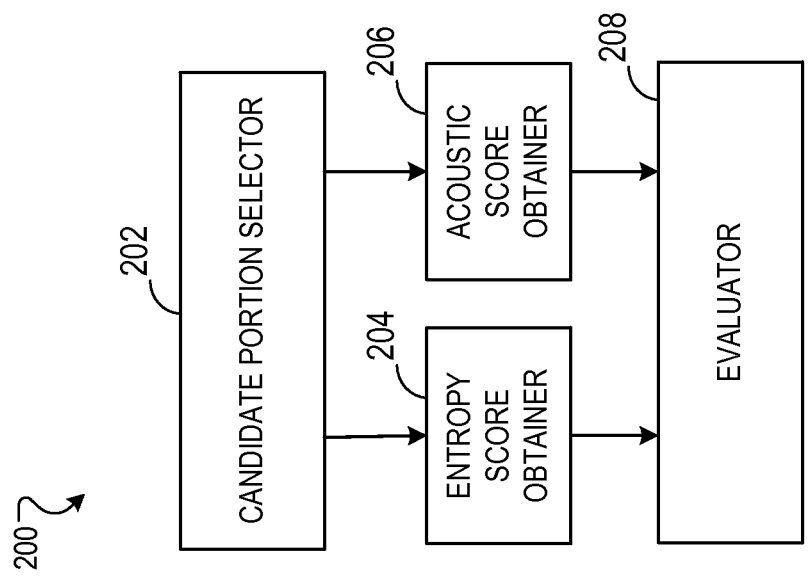
FIG. 2 is a block diagram of an example system for pruning a language model.

FIG. 2 is a block diagram of an example system 200 for pruning a language model. The system 200 may generate an acoustically pruned language model by selectively pruning portions of the language model by balancing reducing the size of the language model with maintaining accuracy in transcription.

The system 200 may include a candidate portion selector 202, an entropy score obtainer 204, an acoustic score obtainer 206, and an evaluator 208. The candidate portion selector 202 may select portions of the language model to evaluate for pruning. The portion of the language model selected for possible pruning may be referred to as a candidate portion.

The candidate portion selector 202 may select all portions of the language model, for example, by iteratively selecting sequences of the language model as the candidate portion. Alternatively or additionally, the candidate portion selector 202 may cumulatively select only a sub-portion of the language model, for example, only sequences of a certain number of items, e.g., four, or more. The candidate portion selector may select sequences in a particular order, for example, based on number of items in a sequence or based on frequency of use of a sequence.

The entropy score obtainer 204 may obtain an entropy score representing information loss that may result from pruning the candidate portion selected by the candidate portion selector 202. The entropy score for a candidate portion may differ based on the sequences within the language model. For example, in a language model including three sequences of: "WRITE TO MR. WRIGHT RIGHT NOW," "TO MR. WRIGHT RIGHT NOW," and "WRITE TO MR. WRIGHT RIGHT," removing the longest sequence of "WRITE TO MR. WRIGHT RIGHT NOW" may result in relatively little information loss as the remaining two sequences may provide sufficient overlapping coverage for transcription.

The entropy score obtainer 204 may generate the entropy score or may receive the entropy score from another source. The entropy score may be generated by determining the relative entropy distance between a n-gram tree representing the language model including the candidate portion and a n-gram tree representing the language model without the candidate portion. A high entropy score may indicate high information loss and a low entropy score may indicate low information loss.

The acoustic score obtainer 206 may obtain an acoustic score representing acoustic confusability of one or more words modeled by the candidate portion of the language model. The acoustic score may be agnostic of the information within the language model. For example, the acoustic score for a candidate portion may always have the same acoustic score regardless of the sequences within the language model. A high acoustic score may indicate high acoustic confusability and a low acoustic score may indicate low acoustic confusability.

The acoustic score obtainer 206 may generate the acoustic score or receive the acoustic score from another source. The acoustic score for a candidate portion may be generated by determining if any words in the candidate portion include homophones. A homophone is a word that sounds similar to another word, but has a different meaning. For example, "write" and "right" sound similar but have different meanings. Some homophones are also homonyms, words that have different meanings and different spellings. A candidate portion with multiple homonyms may have very high acoustic confusability and may have a very high acoustic score.

The evaluator 208 may evaluate whether to prune the candidate portion of the language model using the entropy score and the acoustic score. For example, the evaluator may obtain a pruning threshold. The pruning threshold may represent a threshold for candidate portions to be pruned from the language portion or a threshold for a candidate portions to not be pruned from the language portion. The evaluator 208 may determine whether to prune the candidate portion based on the entropy score, the acoustic score, and the pruning threshold.

The evaluator 208 may adjust the pruning threshold based on the acoustic score. For example, the evaluator 208 may divide the pruning threshold by the acoustic score. The evaluator 208 may compare the entropy score to the adjusted pruning threshold and determine whether to prune the candidate portion based on the comparison. For example, if the entropy score does not exceed the adjusted pruning threshold, the candidate portion may be pruned from the language model.

The entropy score, acoustic score, and pruning threshold may also be used in different arrangements. For example, instead of adjusting the pruning threshold using the acoustic score, the entropy score may be adjusted using the acoustic score by multiplying the entropy score by the acoustic score. The determination whether to prune the candidate portion may also involve additional factors, for example, based on historical transcription error rate for utterances associated with the candidate portion.

When the evaluator 208 determines that a candidate portion should be pruned from the language model, the evaluator 208 may also generate a pruned language model by removing the candidate portion and recalculating probabilities for transcriptions using the remaining candidate portions. Alternatively or additionally, a pruned language model may already be generated by the entropy score obtainer 204 when obtaining the entropy score and the evaluator 208 may determine whether the pruned language model should be used or discarded.

Figure 3:
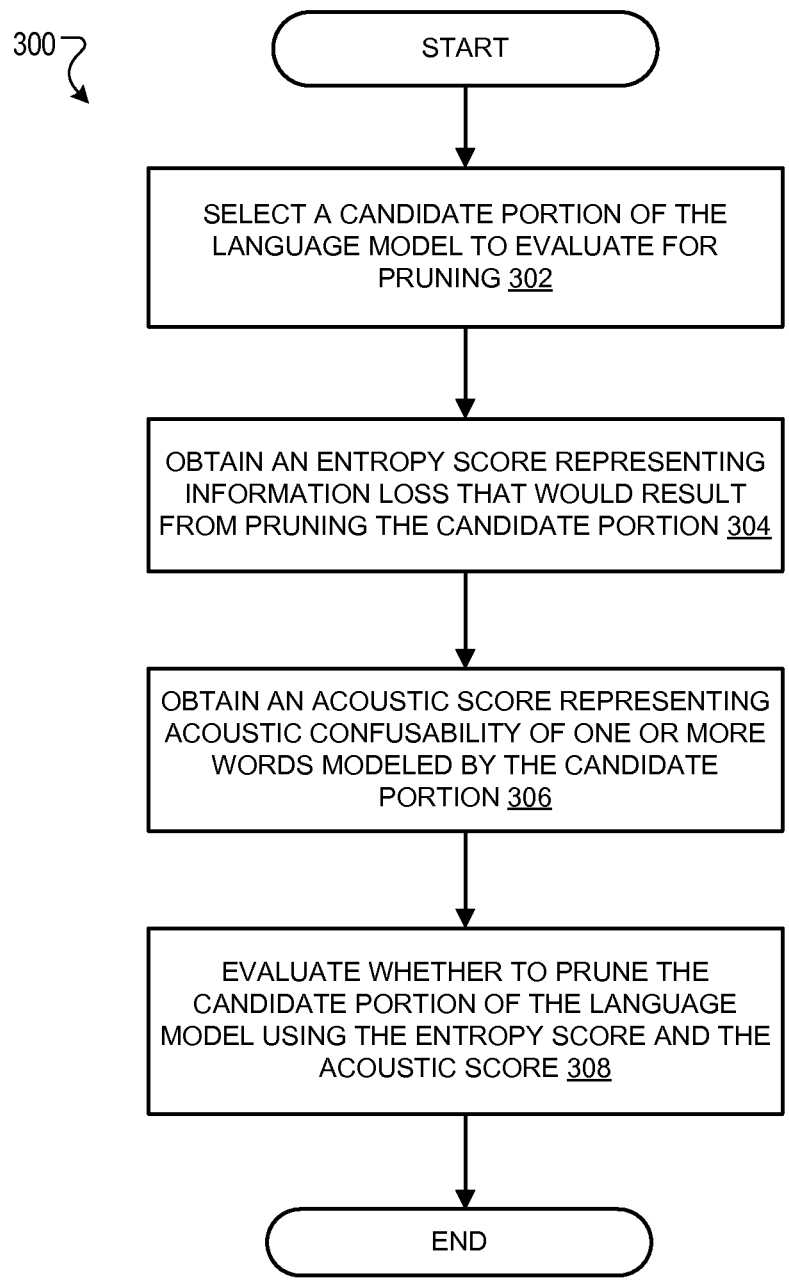
FIG. 3 is a flowchart of an example process for pruning a language model.

FIG. 3 is a flowchart of an example process 300 for pruning a language model. The following describes the process 300 as being performed by components of the system 200 that are described with reference to FIG. 2. However, the process 300 may be performed by other systems or system configurations.

The process 300 may include selecting a candidate portion of the language model to evaluate for pruning (302). The candidate portion selector 202 may select the candidate portion, for example, as described above with respect to the candidate portion selector 202. For example, the candidate portion selector 202 may select the candidate portion "WRITE TO MR." from a language model including other portions of "WRITE TO" and "TO MR."

The process 300 may include obtaining an entropy score representing information loss that would result from pruning the candidate portion (304). The entropy score obtainer 204 may obtain the candidate portion, for example, as described above with respect to the entropy score obtainer 204. For example, the entropy score obtainer may obtain an entropy score of "0.1" by generating an entropy score based on comparing the relative distance between a language model with the selected candidate portion "WRITE TO MR." and a language model without the selected candidate portion. In the example, the entropy score may be low as the language model already includes other portions of "WRITE TO" and "TO MR." so the information loss may be low.

The process 300 may include obtaining an acoustic score representing acoustic confusability of one or more words modeled by the candidate portion (306). The acoustic score obtainer 206 may obtain the acoustic score, for example, as described above with respect to the acoustic score obtainer 206. For example, the acoustic score obtainer 206 may obtain the acoustic score of "3" by determining that the selected candidate portion "WRITE TO MR." includes the homonym "WRITE." In the example, the acoustic score may be high as the presence of the homonym may indicate a high acoustic confusability.

The process 300 may include evaluating whether to prune the candidate portion of the language model using the entropy score and the acoustic score (308). The evaluator 208 may perform the evaluating, for example, as described above with respect to the evaluator 208. For example, the evaluator 208 may obtain a pruning threshold of "0.2," adjust the pruning threshold by dividing by the acoustic score of "3," and determine if the entropy score of "0.1" is greater than the adjusted pruning threshold of "0.067." In the example, the entropy score is less than the pruning threshold but greater than the adjusted pruning threshold, meaning that without consideration of acoustic confusability, the selected candidate portion may have been removed.

For situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
   selecting a candidate portion of a language model to evaluate for pruning;
   obtaining an entropy score representing information loss that would result from pruning the candidate portion of the language model;
   obtaining an acoustic score representing acoustic confusability of one or more words modeled by the candidate portion of the language model;
   evaluating whether to prune the candidate portion of the language model using the entropy score and the acoustic score;
   generating a pruned language model based on pruning the candidate portion from the language model; and
   generating, by a speech recognizer using the pruned language model, a transcription of an utterance.

2. The method of claim 1, wherein the language model includes sequences of contiguous items and the candidate portion includes a sequence of contiguous items.

3. The method of claim 2, wherein the candidate portion includes a homophone and the language model includes second contiguous sequence of items that includes a corresponding homophone.

4. The method of claim 3, wherein obtaining the acoustic score includes determining whether the candidate portion includes a homophone.

5. The method of claim 1, wherein evaluating includes:
   obtaining a pruning threshold;
   adjusting the pruning threshold based on the acoustic score;
   comparing the entropy score to the adjusted pruning threshold; and
   determining whether to prune the candidate portion based on the comparison.

6. The method of claim 1, wherein evaluating includes:
   obtaining a pruning threshold;
   adjusting the entropy score based on the acoustic score;
   comparing the adjusted entropy score to the pruning threshold; and
   determining whether to prune the candidate portion based on the comparison.

7. A system comprising:
   one or more computers and one or more storage devices storing instructions that are operable, when executed by the one or more computers, to cause the one or more computers to perform operations comprising:
   selecting a candidate portion of a language model to evaluate for pruning;
   obtaining an entropy score representing information loss that would result from pruning the candidate portion of the language model;
   obtaining an acoustic score representing acoustic confusability of one or more words modeled by the candidate portion of the language model;

evaluating whether to prune the candidate portion of the language model using the entropy score and the acoustic score; and generating a pruned language model based on pruning the candidate portion from the language model; and generating, by a speech recognizer using the pruned language model, a transcription of an utterance.

8. The system of claim 7, wherein the language model includes sequences of contiguous items and the candidate portion includes a sequence of contiguous items.

9. The system of claim 8, wherein the candidate portion includes a homophone and the language model includes second contiguous sequence of items that includes a corresponding homophone.

10. The system of claim 9, wherein obtaining the acoustic score includes determining whether the candidate portion includes a homophone.

11. The system of claim 7, wherein evaluating includes:
obtaining a pruning threshold;
adjusting the pruning threshold based on the acoustic score;
comparing the entropy score to the adjusted pruning threshold; and
determining whether to prune the candidate portion based on the comparison.

12. The system of claim 7, wherein evaluating includes:
obtaining a pruning threshold;
adjusting the entropy score based on the acoustic score;
comparing the adjusted entropy score to the pruning threshold; and
determining whether to prune the candidate portion based on the comparison.

13. A non-transitory computer-readable medium storing software comprising instructions executable by one or more computers which, upon such execution, cause the one or more computers to perform operations comprising:

selecting a candidate portion of a language model to evaluate for pruning;

obtaining an entropy score representing information loss that would result from pruning the candidate portion of the language model;

obtaining an acoustic score representing acoustic confusability of one or more words modeled by the candidate portion of the language model;

evaluating whether to prune the candidate portion of the language model using the entropy score and the acoustic score;

generating a pruned language model based on pruning the candidate portion from the language model; and generating, by a speech recognizer using the pruned language model, a transcription of an utterance.

14. The medium of claim 13, wherein the language model includes sequences of contiguous items and the candidate portion includes a sequence of contiguous items.

15. The medium of claim 14, wherein the candidate portion includes a homophone and the language model includes second contiguous sequence of items that includes a corresponding homophone.

16. The medium of claim 15, wherein obtaining the acoustic score includes determining whether the candidate portion includes a homophone.

17. The medium of claim 13, wherein evaluating includes:
obtaining a pruning threshold;
adjusting the pruning threshold based on the acoustic score;
comparing the entropy score to the adjusted pruning threshold; and
determining whether to prune the candidate portion based on the comparison.

* * * * *